F. L. FREEMAN.
FOUR WHEEL DRIVING MECHANISM.
APPLICATION FILED MAR. 23, 1911. RENEWED DEC. 10, 1914.

1,145,762.

Patented July 6, 1915.

2 SHEETS—SHEET 1.

Inventor
F. L. Freeman,
By Harry Ellis Chandlee,
Attorney

Witnesses

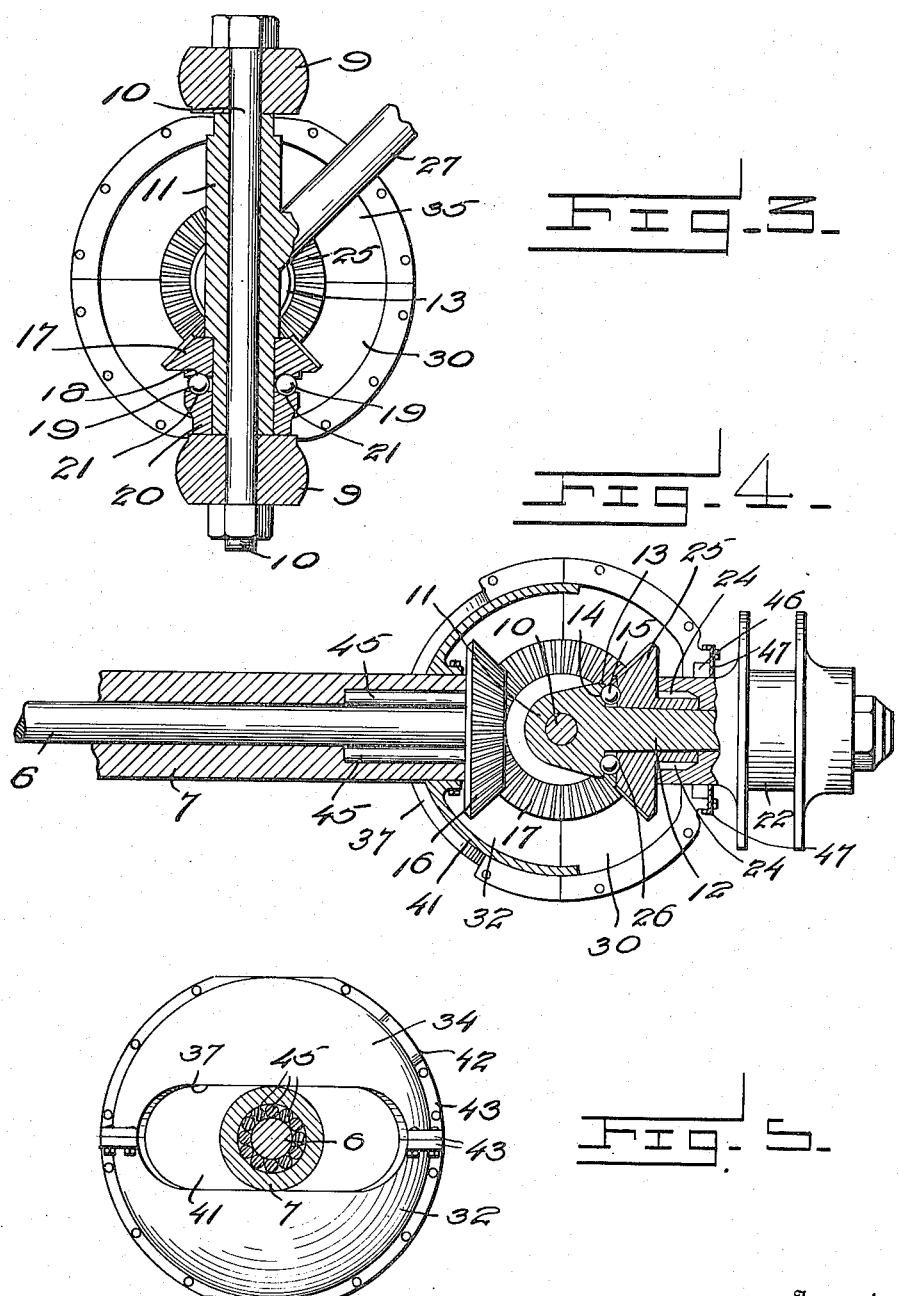

UNITED STATES PATENT OFFICE.

FRANK L. FREEMAN, OF TECUMSEH, NEBRASKA.

FOUR-WHEEL DRIVING MECHANISM.

1,145,762. Specification of Letters Patent. Patented July 6, 1915.

Application filed March 23, 1911, Serial No. 616,405. Renewed December 10, 1914. Serial No. 876,550.

*To all whom it may concern:*

Be it known that I, FRANK L. FREEMAN, a citizen of the United States, residing at Tecumseh, in the county of Johnson and State of Nebraska, have invented certain new and useful Improvements in Four-Wheel Driving Mechanism, of which the following is a specification.

My invention relates to improvements in four-wheel driving mechanisms, and has for its leading object the provision of improved mechanism for steering and driving the front wheels of a motor vehicle.

The further object of the invention is the provision of an improved form of stub axle and mechanism for steering and driving the wheel mounted on said axle.

Other objects and advantages of my improved construction will be apparent from the following description taken in connection with the accompanying drawings, and it will be understood that I may make any changes in the specific construction herein shown and described within the scope of the claim and without departing from or exceeding the spirit of the invention.

Figure 1:
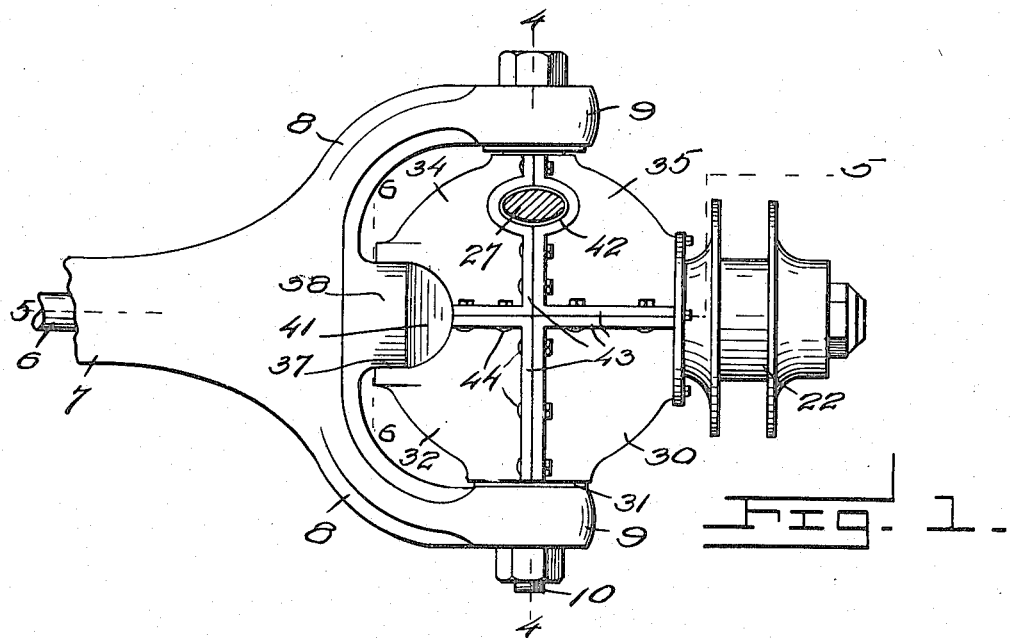
Figure 2:
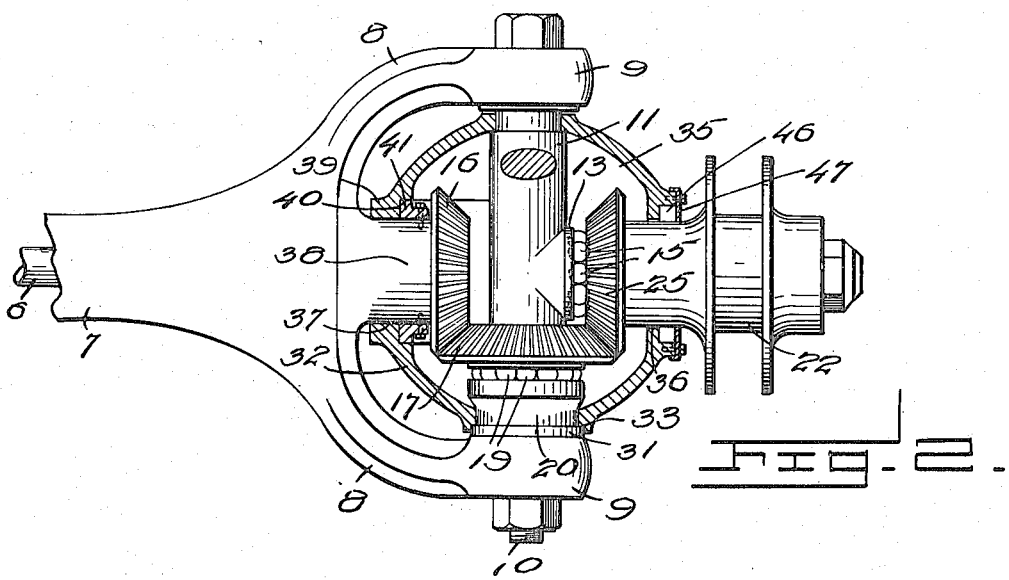

Figure 1 represents a rear view of the incased joint and yoke of the front housing. Fig. 2 represents a similar view with the rear half of the inclosing casing removed. Fig. 3 represents a vertical sectional view on the line 4—4 of Fig. 1. Fig. 4 represents a cross sectional view on the line 5—5 of Fig. 1, and Fig. 5 represents a vertical sectional view on the line 6—6 of Fig. 1.

Referring to the drawing, the numeral 7 designates the front hollow axle of an automobile, having the curved arms or brackets 8 formed thereon provided at their ends with the enlarged portions 9 through which passes the spindle 10 having mounted thereon the sleeve 11 having formed integral therewith the stub axle 12 which projects from one side of the sleeve and having the circular lug 13 formed at the base of the axle with a groove 14 therein providing a race for the ball-bearings 15. Secured on each end of the shaft 6 is a miter gear 16 while in mesh with said gear is the gear 17 loosely mounted on the sleeve 11 and having the groove 18 formed in its under side to provide a race for the bearings 19. A collar 20 is mounted on the sleeve and rests against the lower enlargement 9 of the arm 8 and has the ball race 21 in its upper face in which the lower portions of the balls 19 are engaged.

Mounted upon the stub axle 12 is the hub 22 of the front wheels 23, while fitting into a socket in the inner end of the hub and having ribs 24 projecting outward into the hub is the miter gear 25 in mesh and driven by the gear 17 to rotate the hub, the gear member 25 having a race 26 formed in its inner face to engage the balls 14.

It will thus be seen that the rotation of the shaft 6 will serve through the gears 16, 17, and 25 to drive the front wheel, while to steer the front wheel I form on the sleeve 11 the rearwardly extending arms 27 to which is secured the usual steering rod connecting the arms of the sleeve on each side.

To protect the gears and prevent them from being clogged by dirt, I secure around the same my improved casing comprising the lower outer section 30 of substantially quadraspherical shape having curved recesses to fit around the hub 22 and around the disk 31, the member 30 and its corresponding member 32 having the recesses 33 to receive the upper portion of the disk 31. The member 32 is similar in shape to the member 30 but in place of the semi-circular opening 36 which the sections 30 and 35 have to fit around the hub 22 the sections 32 and 34 have the cut away portions which coincide and together provide the slot 37 in which the inwardly projecting end 38 of the housing 7 slides as the casing is turned. The members 32 and 34 are formed with enlarged or thickened ends surrounding the slot 37 and said ends 39 have the groove 40 formed in their inner face to engage the curved plates 41 which are bolted to the inner end of the housing and fit tightly into the recess 40 to prevent dirt entering the casing at this point.

The members 34 and 35 have the coinciding cut away portions providing the opening 42 through which the operating arm 27 projects, the sections 30, 32, 34 and 35 having the flanges 43 formed thereon through which pass the securing bolts 44 for clamping them in position around the various parts.

In the use of my improvement when the arms 27 are shifted they swing the sleeve 11 with its integral spindle or axle 12 and thus the front wheel and its driving gear around, while as the casing fits tightly against said arm the casing will likewise swing on the spindle 10 as a pivot, the housing moving in the slot 37. To facilitate the rotation of the front shaft 6 I have mounted in the extension 38 of the housing the anti-friction rollers 45, while formed in the outer portion of the members 30 and 35 surrounding the opening 36 is the recess 46 inclosed by the cap plate 47, said recess being adapted to contain suitable packing into which lubricant from within the casing will be forced for lubricating the hub and preventing its binding against the casing.

From the foregoing description taken in connection with the drawings the construction of my improved four-wheel driving mechanism will be readily understood, and it will be seen that I have provided a front housing having solid bracing arms connected by a vertical spindle, a collar mounted on the spindle and having an integrally formed stub axle or spindle, gears carried by the front shaft and by the hub of the front wheel, an intermediate gear for connecting the same, and an inclosing casing for protecting the various parts which moves with the stub axle and has a suitably protected slot to allow it to move around the front axle and housing while preventing dirt from entering.

It will further be observed that I have provided a simple, efficient, and practical driven front wheel in which the driving parts are thoroughly inclosed and protected from dirt and in which the means for drivingly connecting the driven shaft with the hub are of the simplest character which will thoroughly perform their functions and will not become readily disarranged or broken and which can be readily replaced.

I claim:

In a front drive for motor vehicles, the combination with a hollow axle having arms, a spindle carried by the arms, a sectional gear casing, the outer upper and lower sections of which are formed with semicircular openings which when confronting form an opening for the wheel hub, the inner upper and lower sections of said casing being provided with slots which when confronting form an opening for the passage of a portion of the hollow axle, a sleeve surrounding the spindle, an arm connected to the sleeve and passing through the upper sections of the casing, said arm being operable to swing the casing and wheel hub to steer the vehicle.

In testimony whereof I affix my signature, in the presence of two witnesses.

FRANK L. FREEMAN.

Witnesses:
  E. E. YOUNG,
  L. D. SPENCE.